United States Patent
Hayashi

(10) Patent No.: US 10,523,871 B2
(45) Date of Patent: Dec. 31, 2019

(54) IMAGING SYSTEM AND IMAGING CONTROL METHOD WITH DISPLAY OF IMAGE WITH VERTICAL ALIGNMENT

(71) Applicant: FUJIFILM Corporation, Tokyo (JP)

(72) Inventor: Daisuke Hayashi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/899,747

(22) Filed: Feb. 20, 2018

(65) Prior Publication Data

US 2018/0234635 A1    Aug. 16, 2018

Related U.S. Application Data

(63) Continuation of application No. PCT/JP2016/071039, filed on Jul. 15, 2016.

(30) Foreign Application Priority Data

Aug. 26, 2015 (JP) ................. 2015-166853

(51) Int. Cl.
   *H04N 5/232*   (2006.01)
(52) U.S. Cl.
   CPC ..... *H04N 5/23296* (2013.01); *H04N 5/23203* (2013.01)
(58) Field of Classification Search
   CPC ................................. H04N 5/23299
   See application file for complete search history.

(56) References Cited

U.S. PATENT DOCUMENTS 5,396,287 A    3/1995 Cho
6,977,678 B1   12/2005 Wada et al.
(Continued)

FOREIGN PATENT DOCUMENTS

JP    5-236319 A    9/1993
JP    2001-69496 A  3/2001
(Continued)

OTHER PUBLICATIONS

International Preliminary Report on Patentability and Written Opinion of the International Searching Authority (forms PCT/IB/373, PCT/ISA/237 and PCT/IB/326), dated Mar. 8, 2018, for International Application No. PCT/JP2016/071039, with an English translation of the Written Opinion.
(Continued)

*Primary Examiner* — Gary C Vieaux
(74) *Attorney, Agent, or Firm* — Birch, Stewart, Kolasch & Birch, LLP

(57) ABSTRACT

An object of the invention is to provide an imaging system and an imaging control method that remove user discomfort in the display of an image associated with the adjustment of the direction of an optical axis of a pan tilt camera and improve visibility. The above-mentioned object is achieved by an imaging system including a camera that captures an image of an object to acquire object image data, pan/tilt means for rotating the camera in a pan direction and a tilt direction perpendicular to the pan direction, input means for enabling a user to designate a designation point at an arbitrary position of a display screen, designated position acquisition means for acquiring positional information of the designation point, pan/tilt control means for linearly moving an optical axis of the camera from a current position to a position of a designated object corresponding to the designation point to linearly move the designated object from the current position of the display screen to a center of the display screen, and image processing means for rotating the object image data displayed on the display screen on the optical axis of the camera and aligning a vertical direction after the movement of the optical axis with a vertical direction before the movement of the optical axis.

14 Claims, 14 Drawing Sheets

(56) References Cited

U.S. PATENT DOCUMENTS

| | | |
|---|---|---|
| 2006/0070111 A1 | 3/2006 | Kurosawa |
| 2006/0078329 A1 | 4/2006 | Ohnishi et al. |
| 2008/0111891 A1 | 5/2008 | Kurita et al. |
| 2013/0010170 A1 | 1/2013 | Matsuzawa et al. |
| 2013/0342712 A1 | 12/2013 | Kozakura |
| 2015/0077379 A1 | 3/2015 | Hirako |
| 2016/0098138 A1 | 4/2016 | Park et al. |
| 2018/0234635 A1 | 8/2018 | Hayashi |

FOREIGN PATENT DOCUMENTS

| | | | |
|---|---|---|---|
| JP | 2008-204384 A | | 9/2004 |
| JP | 2004-356711 A | | 12/2004 |
| JP | 2006-101009 A | | 4/2006 |
| JP | 2006-115046 | | 4/2006 |
| JP | 2008-124812 A | | 5/2008 |
| JP | 2008204384 A | * | 9/2008 |
| JP | 2013-246313 A | | 12/2013 |
| JP | 2013-246614 A | | 12/2013 |
| JP | 2014-7662 A | | 1/2014 |

OTHER PUBLICATIONS

International Search Report (form PCT/ISA/210), dated Sep. 27, 2016, for International Application No. PCT/JP2016/071039, with an English translation.

International Preliminary Report on Patentability and Written Opinion of the International Searching Authority (forms PCT/IB/373 and PCT/ISA/237), dated Mar. 27, 2018, for International Application No. PCT/JP2016/072210, with an English translation of the Written Opinion.

International Search Report (form PCT/ISA/210), dated Oct. 4, 2016, for International Application No. PCT/JP2016/072210, with an English translation.

Japanese Decision to Grant a Patent, dated Apr. 18, 2018, for Japanese Application No. 2017-541461, with an English machine translation.

Office Action dated Aug. 9, 2019 in U.S. Appl. No. 15/928,757.

* cited by examiner

FIG. 1
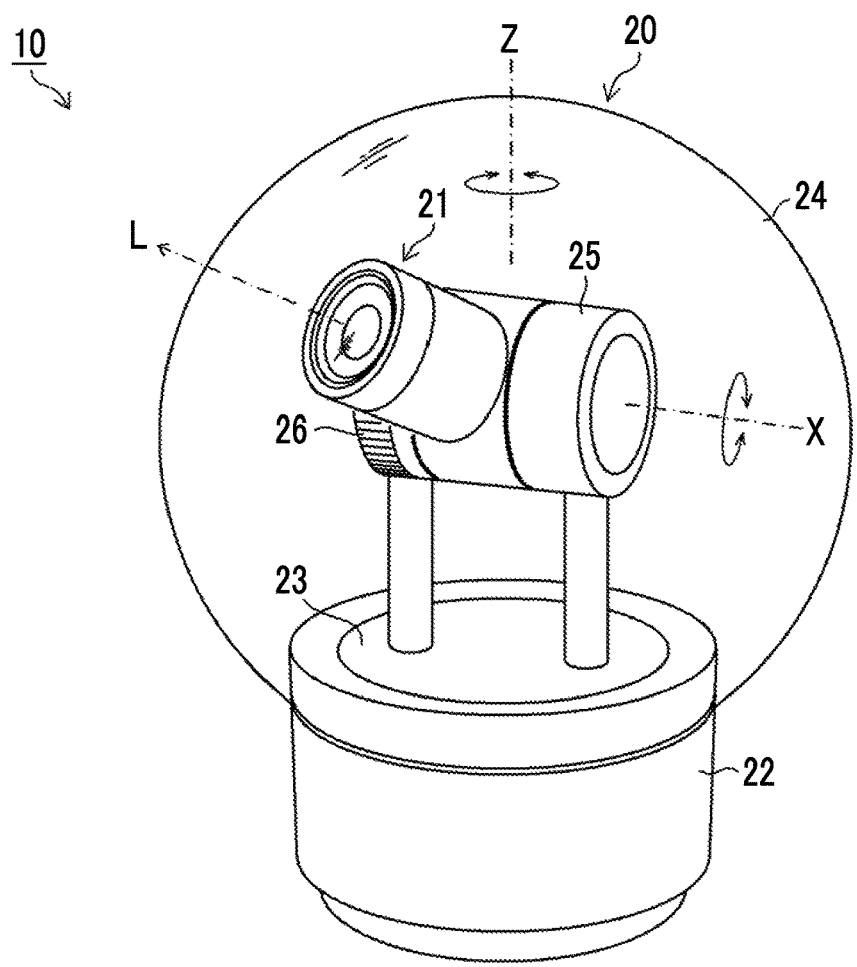
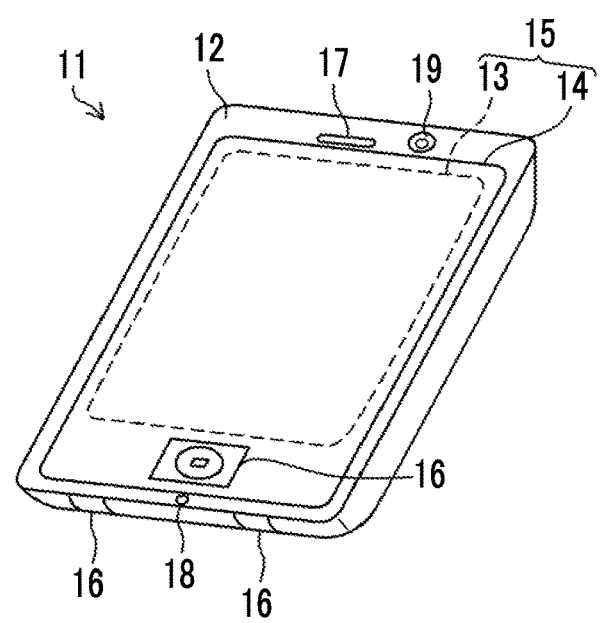

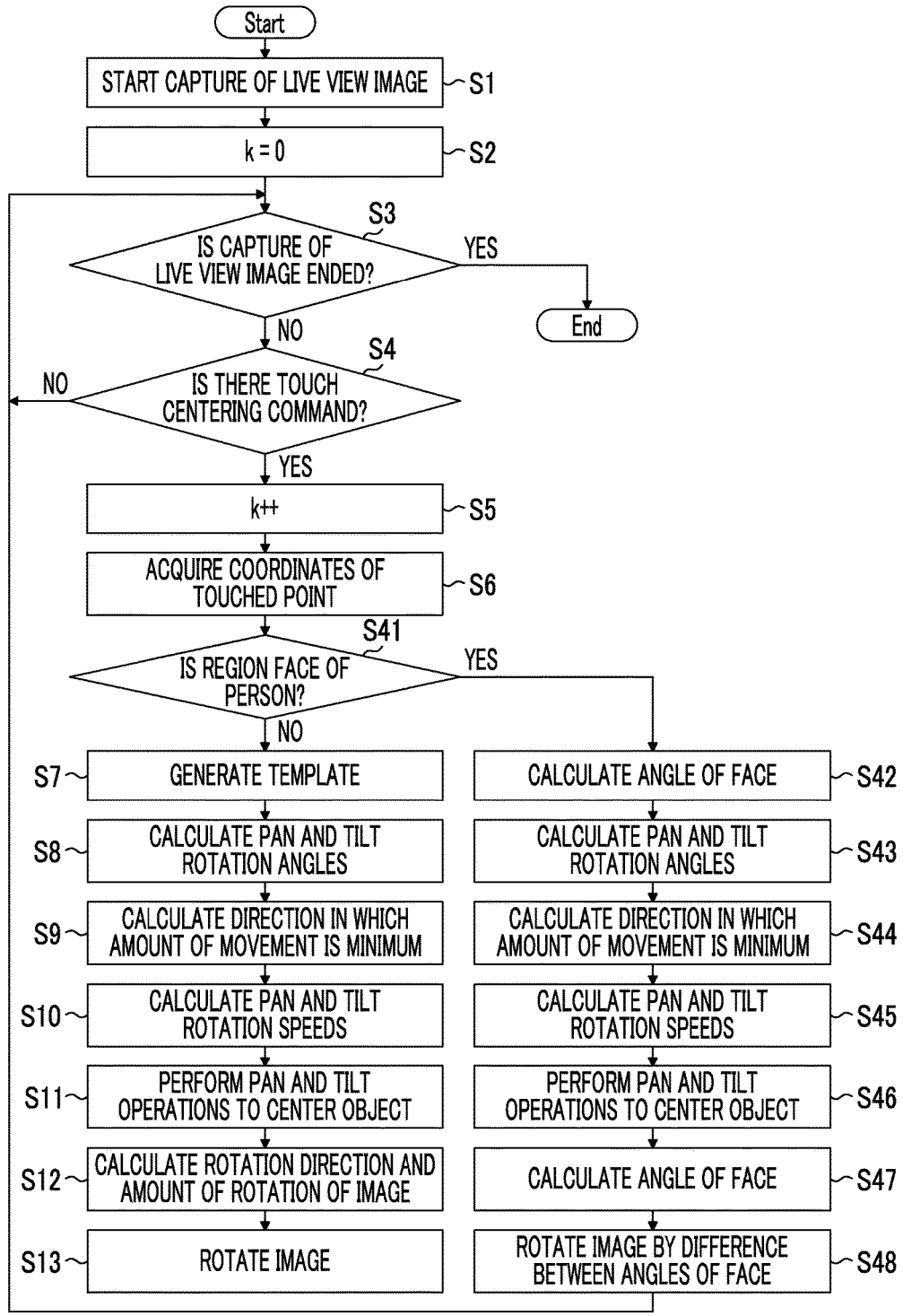

IMAGING SYSTEM AND IMAGING CONTROL METHOD WITH DISPLAY OF IMAGE WITH VERTICAL ALIGNMENT

CROSS-REFERENCE TO RELATED APPLICATIONS

The present application is a Continuation of PCT International Application No. PCT/JP2016/071039 filed on Jul. 15, 2016 claiming priority under 35 U.S.C § 119(a) to Japanese Patent Application No. 2015-166853 filed on Aug. 26, 2015. Each of the above applications is hereby expressly incorporated by reference, in their entirety, into the present application.

BACKGROUND OF THE INVENTION

1. Field of the Invention

The present invention relates to an imaging system and an imaging control method, and more particularly, to an imaging system and an imaging control method that displays an image captured by a remotely controlled pan/tilt camera in real time.

2. Description of the Related Art

An imaging system has been known which remotely controls a camera such that the camera is panned or tilted to adjust the imaging direction of the camera.

JP2006-101009A discloses a technique which, in a case in which a user designates a point on a screen on which an image captured by a pan/tilt camera is displayed, controls an imaging direction of the pan/tilt camera such that an object at the designated position is displayed at the center of the screen.

SUMMARY OF THE INVENTION

However, in a case in which the designated object is displayed at the center of the screen, the vertical direction of the object when the object is designated is likely to be different from the vertical direction of the object when the object is displayed at the center of the screen. In this case, there is user discomfort in the display.

In addition, in some cases, while the imaging direction of the pan/tilt camera is being adjusted in order to display the designated object at the center of the screen, the visibility of the object is likely to be reduced according to the speed of a pan operation and a tilt operation.

The invention has been made in view of the above-mentioned problems and an object of the invention is to provide an imaging system and an imaging control method that remove user discomfort in the display of an image associated with the adjustment of the direction of an optical axis of a pan/tilt camera and improve visibility.

In order to achieve the object, an aspect of an imaging system includes: a camera that captures an image of an object to acquire object image data; pan/tilt means for rotating the camera in a pan direction and a tilt direction perpendicular to the pan direction; display means for displaying the acquired object image data on a display screen; input means for enabling a user to designate a designation point at an arbitrary position of the display screen; designated position acquisition means for acquiring positional information of the designation point; pan/tilt control means for linearly moving an optical axis of the camera from a current position to a position of a designated object corresponding to the designation point to linearly move the designated object displayed on the display screen from the current position of the display screen to a center of the display screen; and image processing means for rotating the object image data displayed on the display screen on the optical axis of the camera and aligning a vertical direction after the movement of the optical axis with a vertical direction before the movement of the optical axis.

According to this aspect, the object designated by the user is linearly moved from the current position of the display screen to the center of the display screen and the vertical direction after the movement is aligned with the vertical direction before the movement. Therefore, it is possible to remove user discomfort in the display of an image associated with the adjustment of the direction of the optical axis of a pan/tilt camera and to improve visibility.

Preferably, the image processing means aligns the vertical direction during the movement of the optical axis with the vertical direction before the movement. With this configuration, it is possible to improve the display visibility of an image while the direction of the optical axis is being adjusted.

Preferably, the image processing means calculates a rotation direction and an amount of rotation of the object image data on the basis of template matching using, as a template, a cutout image including the designated object before the movement of the optical axis. With this configuration, it is possible to appropriately align the vertical direction after the movement of the optical axis with the vertical direction before the movement of the optical axis.

Preferably, the imaging system further includes face detection means for detecting a facial region of a person from the acquired object image data. In a case in which the designated object is the facial region of the person, the image processing means sets the face upright. With this configuration, it is possible to appropriately align the vertical direction after the movement of the optical axis with the vertical direction before the movement of the optical axis.

Preferably, the pan/tilt control means moves the optical axis of the camera in a rotation direction in which an amount of rotation of the camera in the pan direction and an amount of rotation of the camera in the tilt direction are the minimum. With this configuration, it is possible to move the optical axis of the camera in a short time.

Preferably, the imaging system further includes: means for acquiring a first pan-direction rotation angle and a first tilt-direction rotation angle of the camera at a current position with respect to an initial position and calculating a first pan/tilt rotation matrix from an initial-position unit normal vector of an imaging surface at the initial position; means for calculating a current-position unit normal vector of the imaging surface in a case in which the initial-position unit normal vector is rotated by the first pan/tilt rotation matrix; means for calculating a second pan/tilt rotation matrix from the current-position unit normal vector for the designation point; means for calculating a movement destination target vector in a case in which the current-position unit normal vector is rotated by the second pan/tilt rotation matrix; means for calculating a second pan-direction rotation angle and a second tilt-direction rotation angle from the initial-position unit normal vector, using the movement destination target vector; means for calculating a movement-destination pan-direction rotation angle from a difference between the second pan-direction rotation angle and the first pan-direction rotation angle; and means for calculating a movement-destination tilt-direction rotation angle from a difference between the second tilt-direction rotation angle and the first tilt-direction rotation angle. Preferably, the pan/tilt control means controls the pan/tilt means on the basis of the movement-destination pan-direction rotation angle and the movement-destination tilt-direction rotation angle. With this configuration, it is possible to appropriately move the optical axis of the camera from the current position to the position of the object corresponding to the designation point.

Preferably, the pan/tilt control means makes a ratio of a rotation speed of the camera in the pan direction to a rotation speed of the camera in the tilt direction by the pan/tilt means equal to a ratio of the movement-destination pan-direction rotation angle to the movement-destination tilt-direction rotation angle. With this configuration, it is possible to appropriately move the optical axis of the camera in a straight line.

Preferably, the input means includes a touch panel that enables the user to designate the designation point with a touch operation. With this configuration, it is possible to improve operability in a case in which the designation point at an arbitrary position of the display screen is designated.

Preferably, the imaging system further includes a remote camera and a portable terminal. Preferably, the display means and the input means are provided in the portable terminal and the camera, the pan/tilt means, the pan/tilt control means, and the image processing means are provided in the remote camera. Preferably, each of the remote camera and the portable terminal includes communication means for performing communication. With this configuration, the portable terminal can appropriately remotely control the remote camera.

In order to achieve the object, an aspect of an imaging control method includes: a pan/tilt step of rotating a camera that captures an image of an object to acquire object image data in a pan direction and a tilt direction perpendicular to the pan direction; a display step of displaying the acquired object image data on a display screen; an input step of enabling a user to designate a designation point at an arbitrary position of the display screen; a designated position acquisition step of acquiring positional information of the designation point; a pan/tilt control step of linearly moving an optical axis of the camera from a current position to a position of a designated object corresponding to the designation point to linearly move the designated object displayed on the display screen from the current position of the display screen to a center of the display screen; and an image processing step of rotating the object image data displayed on the display screen on the optical axis of the camera and aligning a vertical direction after the movement of the optical axis with a vertical direction before the movement of the optical axis.

According to this aspect, the object designated by the user is linearly moved from the current position of the display screen to the center of the display screen and the vertical direction after the movement is aligned with the vertical direction before the movement. Therefore, it is possible to remove user discomfort in the display of an image associated with the adjustment of the direction of the optical axis of a pan/tilt camera and to improve visibility.

According to the invention, it is possible to improve the visibility of an image associated with the adjustment of the direction of an optical axis of a pan/tilt camera.

BRIEF DESCRIPTION OF THE DRAWINGS

FIG. 1 is an external perspective view illustrating an example of an imaging system according to this embodiment.

FIG. 14 is a flowchart illustrating the process of a modification example of the touch centering function.

DESCRIPTION OF THE PREFERRED EMBODIMENTS

Figure 2:
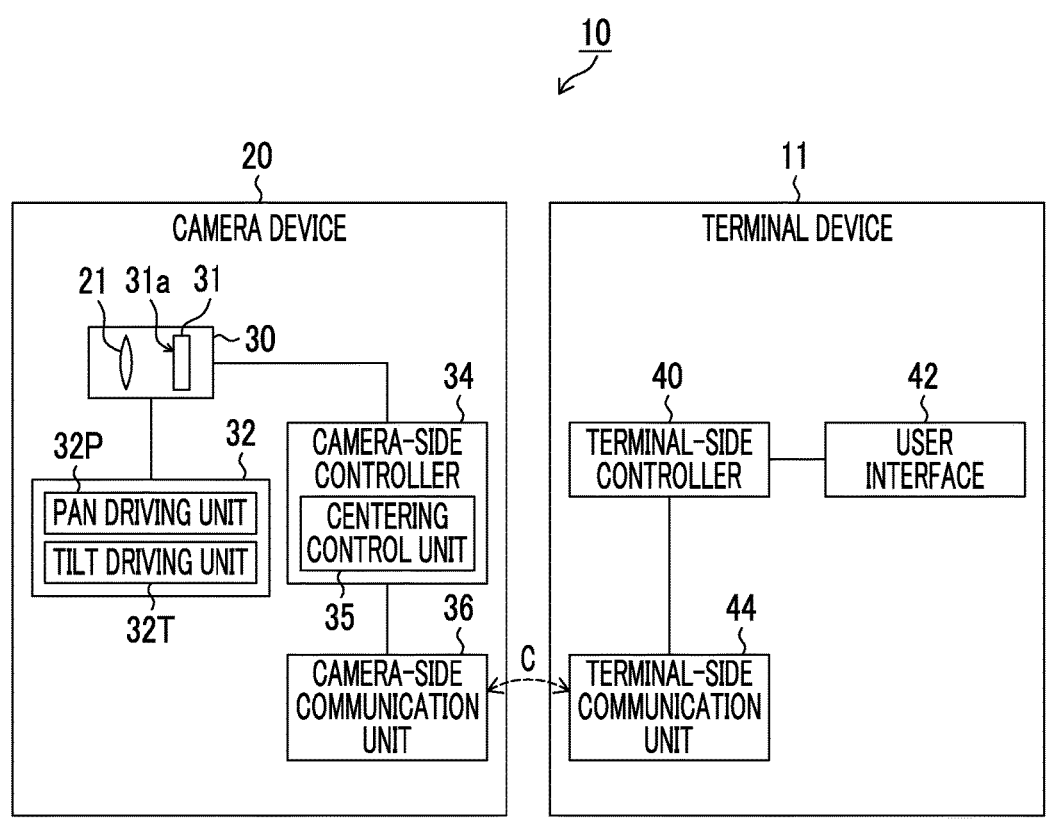
FIG. 2 is a block diagram illustrating an example of the configuration of the imaging system.

Hereinafter, a preferred embodiment of the invention will be described with reference to the accompanying drawings.

[Configuration of Imaging System]

FIG. 1 is an external perspective view illustrating an example of an imaging system 10 according to this embodiment. As illustrated in FIG. 1, the imaging system 10 includes a terminal device 11 that has the form of a tablet-type portable terminal and a camera device 20 that has the form of a pan/tilt remote camera and is connected to the terminal device 11 so as to communicate with the terminal device 11.

In the camera device 20, a holding portion 25 including a gear 26 and an imaging optical system 21 attached to the holding portion 25 are fixed to a base 23 that is provided on a device main body 22. The base 23 is provided so as to be rotatable on the Z-axis which is the axis of the vertical direction of the device main body 22 and a pan operation on the Z-axis is performed by a pan driving unit 32P (see FIG. 2). The gear 26 is provided so as to be rotatable on the X-axis which is the axis of the horizontal direction perpendicular to the vertical direction. Driving force is transmitted from a tilt driving unit 32T (see FIG. 2) through the gear 26 to tilt the imaging optical system 21 on the X-axis. The pan operation and the tilt operation can be performed such that the rotation is infinitely made at an angle of 360 degrees or more. The imaging optical system 21, the holding portion 25 (gear 26), and the base 23 are covered by a dome cover 24 that is a dustproof and drip-proof cover. In FIG. 1, the optical axis of the imaging optical system 21 is represented by letter "L".

A housing 12 of the terminal device 11 includes, for example, a touch panel 15, an operation button 16, a speaker 17, a microphone 18, and a terminal camera 19.

The touch panel 15 is configured such that a user performs a touch operation to designate a point (an example of a designation point) at an arbitrary position on a display screen. The touch panel 15 includes a display 13 (an example of a display screen) that displays various kinds of information and object image data transmitted from the camera device 20 and an operation panel 14 of which the entire surface is transparent and which overlaps the display 13 and function as a command receiving unit receiving commands from the user. The touch panel 15 is configured such that the coordinates of a display position of the display 13 are associated with the coordinates of an operation position of the operation panel 14 and the operation panel 14 can detect an operation position of the display 13.

The operation button 16 functions as the command receiving unit that receives commands from the user together with the operation panel 14. The speaker 17 and the microphone 18 function as a voice output unit and a voice input unit, respectively. The terminal camera 19 can capture an image in response to a command from the user through the operation panel 14 or the operation button 16.

The user can control the operation of the camera device 20, using the terminal device 11. For example, the user can use the terminal device 11 to transmit a captured image from the camera device 20 to the terminal device 11 such that the captured image is displayed on the display 13 or to change the imaging direction (the direction of the optical axis L of the imaging optical system 21) of the camera device 20.

FIG. 2 is a block diagram illustrating an example of the configuration of the imaging system 10.

The camera device 20 is a camera that continuously captures an image of an object and outputs a live view image (an example of object image data) of an object image. The camera device 20 includes an imaging unit 30, an imaging direction adjustment unit 32, a camera-side communication unit 36, and a camera-side controller 34 that controls the overall operation of these units.

The imaging unit 30 includes an imaging optical system 21 and an imaging element 31. The imaging optical system 21 includes, for example, a zoom lens, a focus lens, and a stop which are not illustrated in the drawings and is driven by a driving unit (not illustrated) to perform zooming, focusing, and the adjustment of the amount of incident light. The imaging element 31 is provided in a stage behind the imaging optical system 21 and receives object light through the imaging optical system 21. The imaging element 31 has an imaging surface 31*a* on which a plurality of light receiving elements (not illustrated) are arranged in a matrix. Object light that is incident on the imaging surface 31*a* is focused on a light receiving surface and is converted into an electric signal by each light receiving element. The imaging unit 30 outputs captured image data on the basis of the electric signal. The imaging unit 30 can periodically capture images and output captured image data under the control of the camera-side controller 34.

The imaging direction adjustment unit 32 (an example of pan/tilt means) is a pan/tilt mechanism including the pan driving unit 32P and the tilt driving unit 32T, in addition to the base 23, the holding portion 25, and the gear 26 illustrated in FIG. 1, and can adjust the imaging direction of the imaging unit 30. The imaging direction adjustment unit 32 is controlled by the camera-side controller 34. For example, in a case in which it is necessary to change the imaging direction to the horizontal direction, the imaging direction adjustment unit 32 pans the imaging unit 30 such that the imaging direction is changed to the horizontal direction by the necessary amount of movement under the control of the camera-side controller 34 (an example of a pan/tilt step). Similarly, in a case in which it is necessary to change the imaging direction to the vertical direction, the imaging direction adjustment unit 32 tilts the imaging unit 30 such that the imaging direction is changed to the vertical direction by the necessary amount of movement under the control of the camera-side controller 34 (an example of the pan/tilt step).

In particular, in this example, the camera-side controller 34 includes a centering control unit 35. The centering control unit 35 controls the imaging direction adjustment unit 32 such that the imaging direction is adjusted and a designated object is displayed at the center of the display 13 (see FIG. 1).

The camera-side communication unit 36 (an example of communication means) is connected to the camera-side controller 34, communicates with the terminal device 11 (particularly, a terminal-side communication unit 44 which will be described below) (see letter "C" in FIG. 2), transmits data from the camera device 20 to the terminal device 11, and receives data transmitted from the terminal device 11 to the camera device 20. That is, the camera-side communication unit 36 transmits data sent from the camera-side controller 34 to the terminal device 11 (terminal-side communication unit 44), receives data transmitted from the terminal device 11 (terminal-side communication unit 44), and transmits the received data to the camera-side controller 34.

Data transmitted between the camera device 20 (camera-side communication unit 36) and the terminal device 11 (terminal-side communication unit 44) is not particularly limited. For example, various commands or captured image data acquired by the imaging unit 30 can be transmitted and received between the camera device 20 and the terminal device 11 if necessary.

In contrast, the terminal device 11 connected to the camera device 20 includes a user interface 42, the terminal-side communication unit 44, and a terminal-side controller 40 that controls the overall operation of the terminal device 11.

The terminal-side communication unit 44 (an example of communication means) can communicate with the camera-side communication unit 36. The terminal-side communication unit 44 receives data transmitted from the camera-side communication unit 36 and transmits the received data to the terminal-side controller 40. In addition, the terminal-side communication unit 44 transmits data sent from the terminal-side controller 40 to the camera-side communication unit 36. A communication method between the terminal-side communication unit 44 and the camera-side communication unit 36 is not particularly limited. The communication method may be a wired connection method or a wireless connection method. For example, the following communication method can be used: a communication method based on a wireless local area network (LAN) according to, for example, an IEEE802.11a/b/g/n standard defined by The Institute of Electrical and Electronics Engineers, Inc. (IEEE); or a communication method based on near field communication according to, for example, a Bluetooth (registered trademark) standard.

The terminal-side controller 40 is connected to the user interface 42 and the terminal-side communication unit 44 and performs various kinds of control on the basis of data such as commands transmitted from the user interface 42. In addition, the terminal-side controller 40 controls the terminal-side communication unit 44 such that data is transmitted to the camera-side communication unit 36, if necessary.

Furthermore, the terminal-side controller 40 functions as display means for displaying an image on the display 13.

The user interface 42 is an interface with the user of the terminal device 11. Therefore, for example, the user interface 42 includes the display 13 that can display an image, the operation panel 14 and the operation button 16 which receive commands from the user, the speaker 17 that provides a voice to the user, and the microphone 18 acquires a voice.

[Outline of Touch Centering Function]

The outline of a touch centering function which is one of the functions of the imaging system 10 will be described. The touch centering function is a (centering) function that enables the user to operate the operation panel 14 such that the object displayed at an arbitrary position of the touch panel 15 is displayed at a central position of the touch panel 15.

Figure 3A:
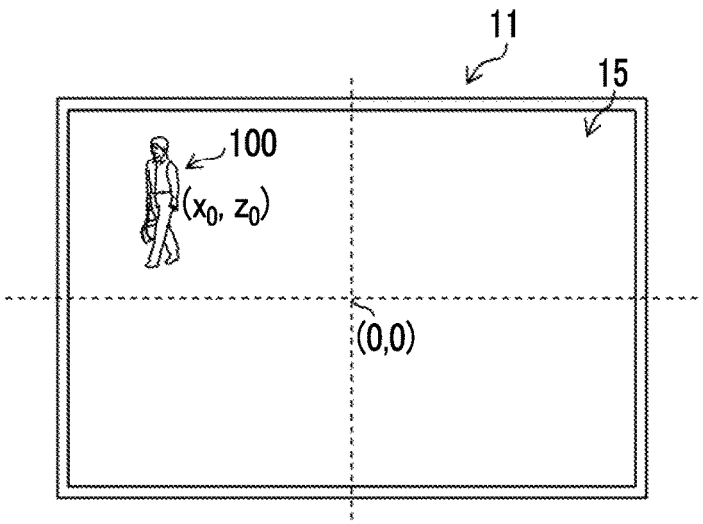
FIGS. 3A to 3C are diagrams illustrating the outline of a touch centering function.
Figure 3B:
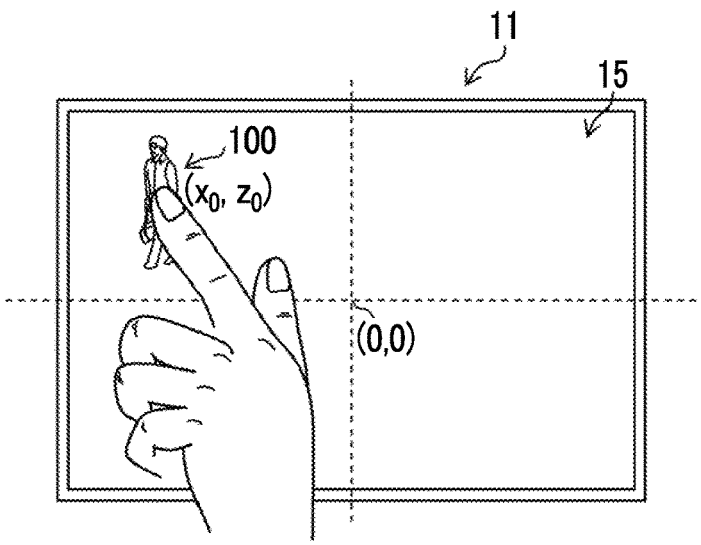
Figure 3C:
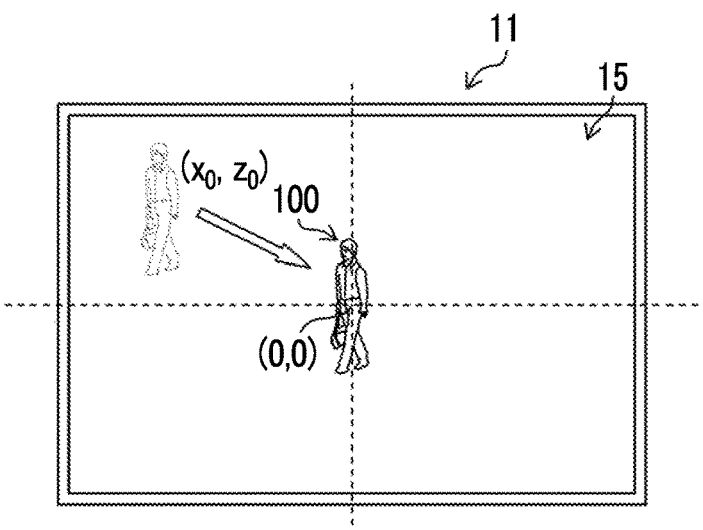

FIG. 3(*a*) is a diagram illustrating an example of a live view image displayed on the touch panel 15. The live view image is captured by the camera device 20 and is an image of an object 100. Here, it is assumed that the coordinates of the center of the touch panel 15 are the origin (0, 0) and the coordinates of the position (an example of the current position) where the object 100 is displayed are $(X_0, Z_0)$.

Here, it is assumed that the user wants to display the object 100 at the center of the touch panel 15. In this case, as illustrated in FIG. 3(*b*), the user touches the position (the position corresponding to the coordinates $(X_0, Z_0)$ of the display) where the object 100 is displayed on the touch panel 15 with, for example, a fingertip (touch centering operation).

The touch panel 15 receives the coordinates $(X_0, Z_0)$ as an input in response to the touch centering operation of the user. When receiving the input, the camera device 20 controls the imaging direction adjustment unit 32 such that the imaging direction is adjusted and the object 100 at the position corresponding to the coordinates $(X_0, Z_0)$ is displayed at the origin (0, 0) of the display 13. That is, the optical axis L of the camera is moved from the current position to the position of the object 100 corresponding to the coordinates $(X_0, Z_0)$. In this way, as illustrated in FIG. 3(*c*), the object 100 displayed at the position corresponding to the coordinates $(X_0, Z_0)$ of the display 13 is moved to the center (the origin (0, 0)) of the display 13.

As such, the object designated by the touch panel 15 is displayed at the center of the display 13 by the touch centering function. In addition, in this embodiment, the imaging direction is adjusted such that the object 100 is linearly moved from the coordinates $(X_0, Z_0)$ to the origin (0, 0). In addition, a captured image is rotated on the origin (0, 0) (optical axis L) such that the vertical direction of the object 100 displayed at the origin (0, 0) after the imaging direction is adjusted is aligned with the vertical direction of the object 100 displayed at the coordinates $(X_0, Z_0)$ before the imaging direction is adjusted.

[Rotation Matrix of Pan and Tilt Operations]

Figure 4A:
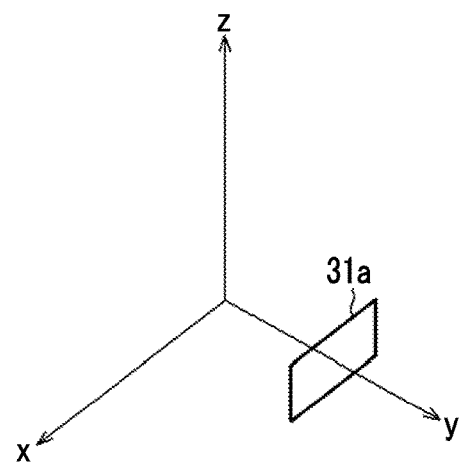
FIGS. 4A to 4C are diagrams illustrating a change in a unit normal vector of an imaging surface associated with pan and tilt operations.
Figure 4B:
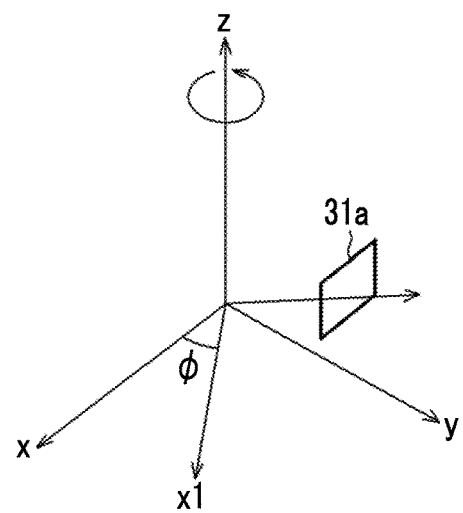
Figure 4C:
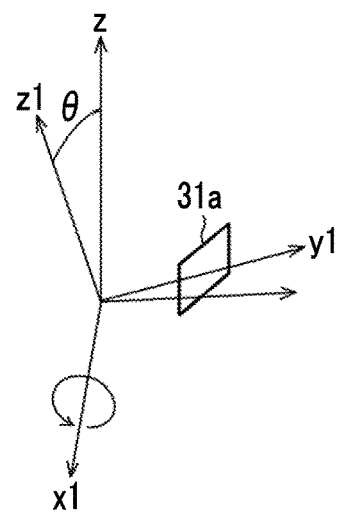

Here, a rotation matrix of the pan and tilt operations of the imaging unit 30 is considered. As illustrated in FIG. 4(*a*), it is assumed that the imaging surface 31*a* of the imaging element 31 is provided so as to be perpendicular to the Y-axis as an initial position of the camera device 20 (the optical axis L is aligned with the Y-axis). In this case, an initial unit normal vector of the imaging surface can be represented by the following Expression 1.

$$\vec{e_0} = \begin{pmatrix} 0 \\ 1 \\ 0 \end{pmatrix} \quad \text{(Expression 1)}$$

Here, in a case in which the pan direction of the imaging unit 30 is a Z-axis rotation direction and a rotation angle on the Z-axis in the clockwise direction as a positive direction of the Z-axis is seen from the origin is φ as illustrated in FIG. 4(*b*), the rotation matrix can be represented by the following Expression 2.

$$A = \begin{pmatrix} \cos\phi & \sin\phi & 0 \\ -\sin\phi & \cos\phi & 0 \\ 0 & 0 & 1 \end{pmatrix} \quad \text{(Expression 2)}$$

In addition, in a case in which the X-axis after the imaging unit 30 is panned is an X1-axis, the tilt direction of the imaging unit 30 is an X1-axis rotation direction, and a rotation angle on the X1-axis in the clockwise direction as a positive direction of the X1-axis is seen from the origin is θ as illustrated in FIG. 4(*c*), the rotation matrix can be represented by the following Expression 3.

$$B = \begin{pmatrix} 1 & 0 & 0 \\ 0 & \cos\theta & \sin\theta \\ 0 & -\sin\theta & \cos\theta \end{pmatrix} \quad \text{(Expression 3)}$$

Therefore, the rotation matrix of the pan and tilt operations of the imaging unit 30 can be represented by the following Expression 4.

$$C = BA = \begin{pmatrix} 1 & 0 & 0 \\ 0 & \cos\theta & \sin\theta \\ 0 & -\sin\theta & \cos\theta \end{pmatrix} \begin{pmatrix} \cos\phi & \sin\phi & 0 \\ -\sin\phi & \cos\phi & 0 \\ 0 & 0 & 1 \end{pmatrix} = \begin{pmatrix} \cos\phi & \sin\phi & 0 \\ -\cos\theta\sin\phi & \cos\theta\cos\phi & \sin\theta \\ \sin\theta\sin\phi & -\sin\theta\cos\phi & \cos\theta \end{pmatrix} \quad \text{(Expression 4)}$$

The pan and tilt operations change the X-axis, the Y-axis, and the Z-axis of the camera device 20 at the initial position to the X1-axis, a Y1-axis, and a Z1-axis, respectively, as illustrated in FIG. 4(*c*).

In the touch centering function, since the coordinates of the object displayed on the display 13 in the screen is designated, the rotation angles of the pan and tilt operations are designated. However, the rotation axes of the camera device 20 are only two axes in the pan direction (horizontal direction) and the tilt direction (vertical direction). Therefore, in a case in which the tilt angle is not 0 degrees (horizontal), it is difficult to directly perform the pan and tilt operations at the angles designated on the screen. For this reason, the rotation angles of the pan and tilt operations are calculated by a process which will be described below.

[Details of Touch Centering Function]

The detailed process (an example of an imaging control method) of the touch centering function will be described with reference to the flowchart illustrated in FIG. 5.

First, the user operates the operation panel 14 or the operation button 16 of the terminal device 11 to input a command to start the capture of a live view image by the camera device 20. The capture start command is input to the camera-side controller 34 through the terminal-side communication unit 44 and the camera-side communication unit 36. The camera-side controller 34 directs the imaging unit 30 to start the capture of an image. Then, the imaging element 31 starts to output an image signal.

The camera-side controller 34 acquires captured image data output from the imaging unit 30 and transmits the captured image data to the terminal device 11 through the camera-side communication unit 36. In the terminal device 11, the terminal-side communication unit 44 receives the captured image data and outputs the captured image data to the terminal-side controller 40. The terminal-side controller 40 displays the captured image data on the touch panel 15 (Step S1, an example of a display step).

Hereinafter, it is assumed that the imaging unit 30 captures a motion picture under the control of the camera-side controller 34 and the terminal-side controller 40 displays the captured image data as a live view image on the touch panel 15.

Then, the centering control unit 35 initializes a variable k to 0 (Step S2) and the camera-side controller 34 determines whether to end the capture of the live view image (Step S3). In a case in which a capture end command is input through the touch panel 15 or the operation button 16, the camera-side controller 34 ends the capture of the live view image.

In a case in which the capture end command is not input, the centering control unit 35 determines whether a touch centering command has been input (Step S4). The touch centering command is input by a touch centering operation for a designation point which is an arbitrary point where the object (designated object) that the user wants to center is displayed in the object image (object image data) displayed on the touch panel 15 (an example of input means), as described with reference to FIG. 3(*b*) (an example of an input step).

In a case in which the touch centering command is not input, the process returns to Step S3 and the camera-side controller 34 repeatedly performs the same process as described above. In a case in which the touch centering command is input, that is, in a case in which the touch centering operation is performed through the touch panel 15, the process proceeds to Step S5 and the variable k is increased (Step S5).

Figure 6:
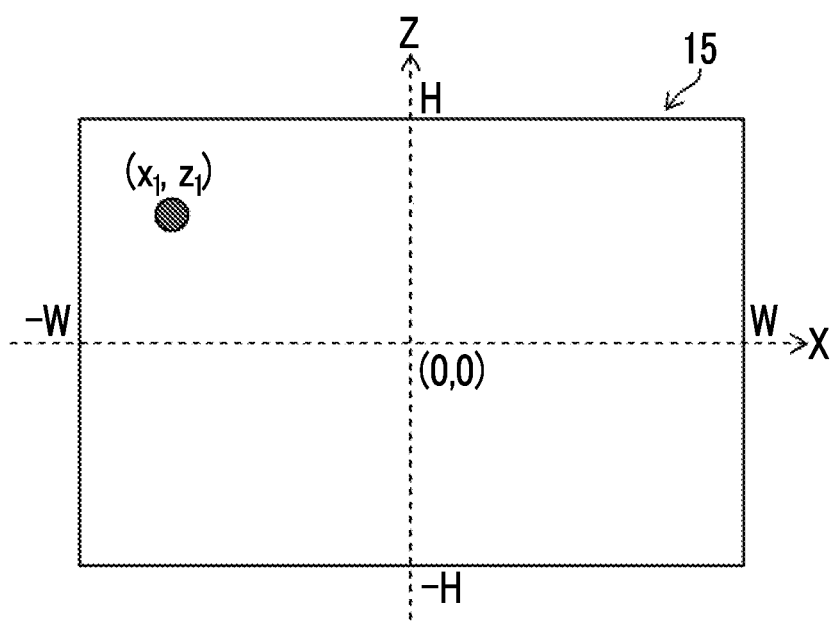
FIG. 6 is a diagram illustrating the coordinates on a touch panel.

Then, the centering control unit 35 (an example of designated position acquisition means) acquires the coordinates (an example of positional information of the designation point) of the point (designation point) subjected to the touch centering operation on the touch panel 15 (Step S6, an example of a designated position acquisition step). As illustrated in FIG. 6, the center of the touch panel 15 is the origin (0, 0) and the coordinates from −W to W in the X-axis direction which is the horizontal axis and from −H to H in the Z-axis direction which is the vertical axis are allocated. Here, it is assumed that the coordinates of the position subjected to the touch centering operation are $(X_1, Z_1)$.

Figure 7A:
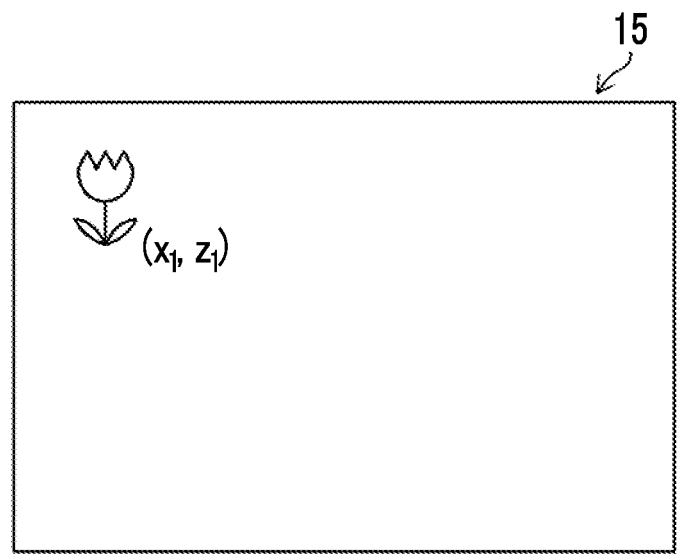
FIGS. 7A and 7B are diagrams illustrating the generation of a template image.
Figure 7B:
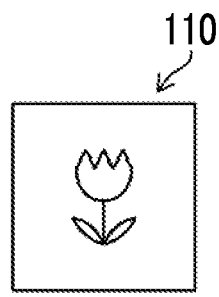

Then, the centering control unit 35 generates a template image 110 in the vicinity of the point subjected to the touch centering operation (Step S7). FIG. 7(*a*) is a diagram illustrating the display of the touch panel 15 and FIG. 7(*b*) is a diagram illustrating an example of the template image 110 (an example of a cutout image including a designated object) generated by cutting out an image including the coordinates $(X_1, Z_1)$ subjected to the touch centering operation from a display image illustrated in FIG. 7(*a*). The size of the template image 110 may be appropriately determined.

Figure 8:
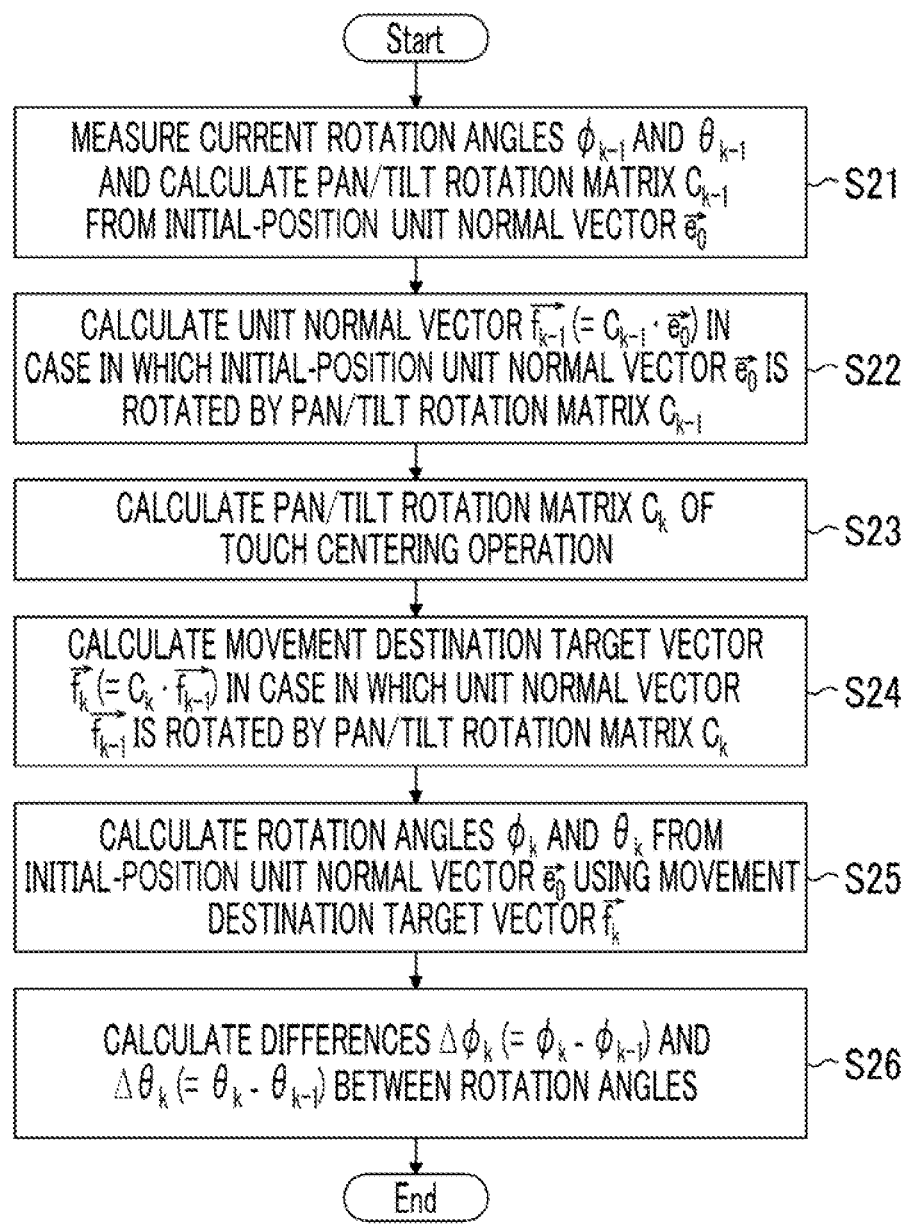
FIG. 8 is a flowchart illustrating a process for calculating the rotation angles of the pan and tilt operations.

Then, the centering control unit 35 calculates the rotation angles of the pan and tilt operations (Step S8). The process of calculating the rotation angles of the pan and tilt operations will be described with reference to the flowchart illustrated in FIG. 8.

First, the centering control unit 35 measures a pan-direction rotation angle $\varphi_{k-1}$ and a tilt-direction rotation angle $\theta_{k-1}$ (an example of a first pan-direction rotation angle and a first tilt-direction rotation angle at the current position of the camera with respect to the initial position) of a unit normal vector $\vec{e_0}$ of the imaging surface 31*a* at the initial position (an example of an initial-position unit normal vector) and the current imaging direction (the direction of the optical axis L) (an example of the current position) and calculates a pan/tilt rotation matrix $C_{k-1}$ (an example of a first pan/tilt rotation matrix) from the initial-position unit normal vector $\vec{e_0}$ (Step S21). Here, "→" in $(\vec{e_0})$ indicates a vector.

Then, the centering control unit 35 calculates a unit normal vector $\vec{f_{k-1}}$ ($=C_{k-1} \cdot \vec{e_0}$) at the current position (an example of a current-position unit normal vector) in a case in which the initial-position unit normal vector $\vec{e_0}$ is rotated by the pan/tilt rotation matrix $C_{k-1}$ (Step S22).

Then, the centering control unit 35 calculates a pan/tilt rotation matrix $C_k$ (an example of a second pan/tilt rotation matrix) of the coordinates $(X_1, Z_1)$ of the position subjected to the touch centering operation from the current-position unit normal vector $\vec{f_{k-1}}$ (Step S23).

Here, in a case in which the horizontal angle of view of the imaging optical system 21 is $2\psi_x$ and the vertical angle of view thereof is $2\psi_z$, the pan-direction rotation angle $\varphi$ and the tilt-direction rotation angle $\theta$ by the touch centering operation can be represented by the following expressions:

$$\varphi = 2\psi_x \cdot X_1 / W \quad \text{(Expression 5); and}$$

$$\theta = 2\psi_z \cdot Z_1 / H \quad \text{(Expression 6).}$$

The rotation angles $\varphi$ and $\theta$ are substituted into Expression 4 to calculate the pan/tilt rotation matrix $C_k$.

In addition, the centering control unit 35 calculates a movement destination target vector $\vec{f_k}$ ($=C_k \cdot \vec{f_{k-1}}$) in a case in which the current-position unit normal vector $\vec{f_{k-1}}$ is rotated by the pan/tilt rotation matrix $C_k$ (Step S24). The centering control unit 35 calculates a pan-direction rotation angle $\varphi_k$ (an example of a second pan-direction rotation angle) and a tilt-direction rotation angle $\theta_k$ (an example of a second tilt-direction rotation angle) from the initial-position unit normal vector $\vec{e_0}$, using the movement destination target vector $\vec{f_k}$ (Step S25).

Finally, the centering control unit 35 calculates a pan-operation rotation angle $\Delta\varphi_k$ (an example of a movement-destination pan-direction rotation angle) and a tilt-operation rotation angle $\Delta\theta_k$ (an example of a movement-destination tilt-direction rotation angle) by the touch centering operation (Step S26). The pan-operation rotation angle $\Delta\varphi_k$ and the tilt-operation rotation angle $\Delta\theta_k$ are a difference between the pan-direction rotation angle $\varphi_{k-1}$ calculated in Step S21 and the pan-direction rotation angle $\varphi_k$ calculated in Step S25 and a difference between the tilt-direction rotation angle $\theta_{k-1}$ calculated in Step S21 and the tilt-direction rotation angle $\theta_k$ calculated in Step S25, respectively, and can be represented by the following expressions:

$$\Delta\varphi_k = \Delta\varphi_k - \Delta\varphi_{k-1} \quad \text{(Expression 7); and}$$

$$\Delta\theta_k = \Delta\theta_k - \Delta\theta_{k-1} \quad \text{(Expression 8).}$$

In this embodiment, the rotation angle of the imaging optical system 21 with respect to the initial position is measured as the degree of the touch centering operation to reduce the accumulative calculation error of the pan and tilt operations.

Returning to FIG. 5, the centering control unit 35 calculates the direction in which the amount of movement of the pan and tilt operations is the minimum (Step S9). In this embodiment, the camera device 20 can infinitely perform the pan operation and the tilt operation at an angle of 360 degrees or more. Therefore, in a case in which the pan operation is performed at the rotation angle $\Delta\varphi_k$, there are two pan rotation directions. Similarly, in a case in which the tilt operation is performed at the rotation angle $\Delta\theta_k$, there are two tilt rotation directions. Here, the direction in which the amount of movement is the minimum is calculated from these rotation directions.

A process for calculating the direction in which the amount of movement is the minimum will be described with reference to the flowcharts illustrated in FIGS. 9 and 10.

Figure 9:
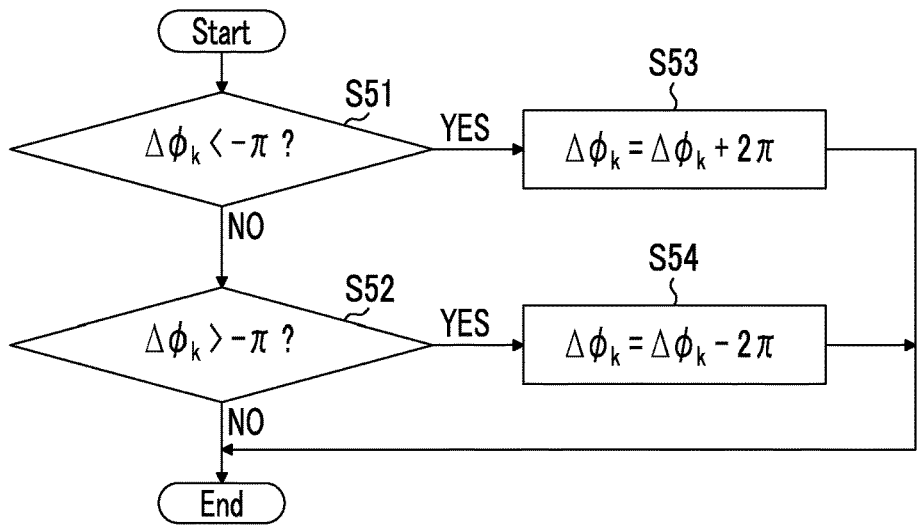
FIG. 9 is a flowchart illustrating a process for calculating a direction in which the amount of movement of a pan operation is the minimum.

FIG. 9 is a flowchart illustrating the process for calculating the direction in which the amount of movement of the pan operation is the minimum.

First, the centering control unit 35 determines whether the pan-operation rotation angle $\Delta\varphi_k$ calculated in Step S8 (Steps S21 to S26) is less than $-\pi$ [rad] (Step S51). In a case in which $\Delta\varphi_k$ is equal to or greater than $-\pi$ [rad], the process proceeds to Step S52. In a case in which $\Delta\varphi_k$ is less than $-\pi$ [rad], the process proceeds to Step S53.

In Step S52, the centering control unit 35 determines whether $\Delta\varphi_k$ is greater than $\pi$ [rad] (Step S52). In a case in which $\Delta\varphi_k$ is equal to or less than $\pi$ [rad], the centering control unit 35 uses the value of $\Delta\varphi_k$, without any change, and ends the process. In a case in which $\Delta\varphi_k$ is greater than $\pi$ [rad], the process proceeds to Step S54.

In Step S53, the centering control unit 35 adds $2\pi$ [rad] to $\Delta\varphi_k$ (Step S53) and ends the process. In contrast, in Step S54, the centering control unit 35 subtracts $2\pi$ [rad] from $\Delta\varphi_k$ (Step S54) and ends the process.

The calculated $\Delta\varphi_k$ is a rotation angle indicating the direction in which the amount of movement of the pan operation is the minimum.

Figure 10:
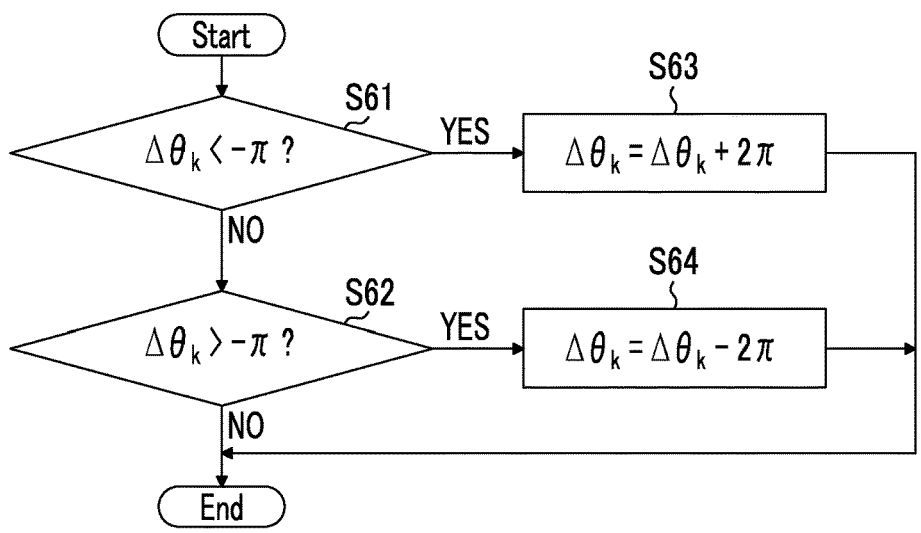
FIG. 10 is a flowchart illustrating a process for calculating a direction in which the amount of movement of a tilt operation is the minimum.

FIG. 10 is a flowchart illustrating the process for calculating the direction in which the amount of movement of the tilt operation is the minimum. The content of the process is the same as that in the flowchart illustrated in FIG. 9. That is, in a case in which the tilt-operation rotation angle $\Delta\theta_k$ calculated in Step S8 (Steps S21 to S26) is less than $-\pi$ [rad], the centering control unit 35 adds $2\pi$ [rad] to $\Delta\theta_k$ (Step S63). In a case in which the tilt-operation rotation angle $\Delta\theta_k$ is greater than $\pi$ [rad], the centering control unit 35 subtracts $2\pi$ [rad] from $\Delta\theta_k$ (Step S64). In a case in which the tilt-operation rotation angle $\Delta\theta_k$ is equal to or greater than $-\pi$ [rad] and equal to or less than $\pi$ [rad], the centering control unit 35 uses the value of $\Delta\theta_k$ calculated in Step S7, without any change, and ends the process. The calculated $\Delta\theta_k$ is a rotation angle indicating the direction in which the amount of movement of the tilt operation is the minimum.

Figure 11:
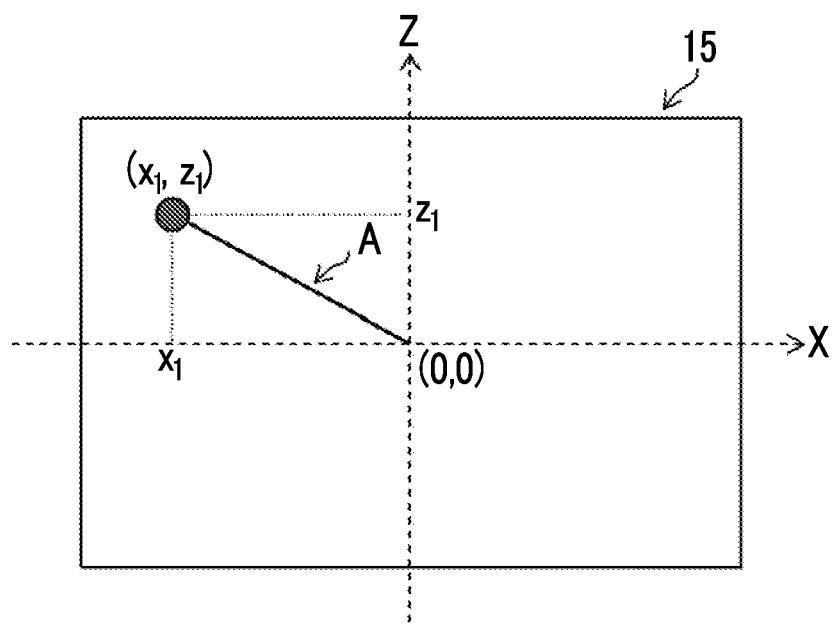
FIG. 11 is a diagram illustrating the trajectory of an object that is being centered.

Returning to FIG. 5, then, the centering control unit 35 calculates the rotation speeds of the pan and tilt operations (Step S10). During the pan and tilt operations (the movement of the optical axis L) by the touch centering function, the live view image is continuously captured and displayed. FIG. 11 is a diagram illustrating the trajectory of the object centered by the touch centering function. As illustrated in FIG. 11, in this embodiment, in a case in which the object at the coordinates $(X_1, Z_1)$ is centered on the origin $(0, 0)$, the object is centered so as to be moved on a straight line A connecting the coordinates $(X_1, Z_1)$ and the origin $(0, 0)$.

Figure 12:
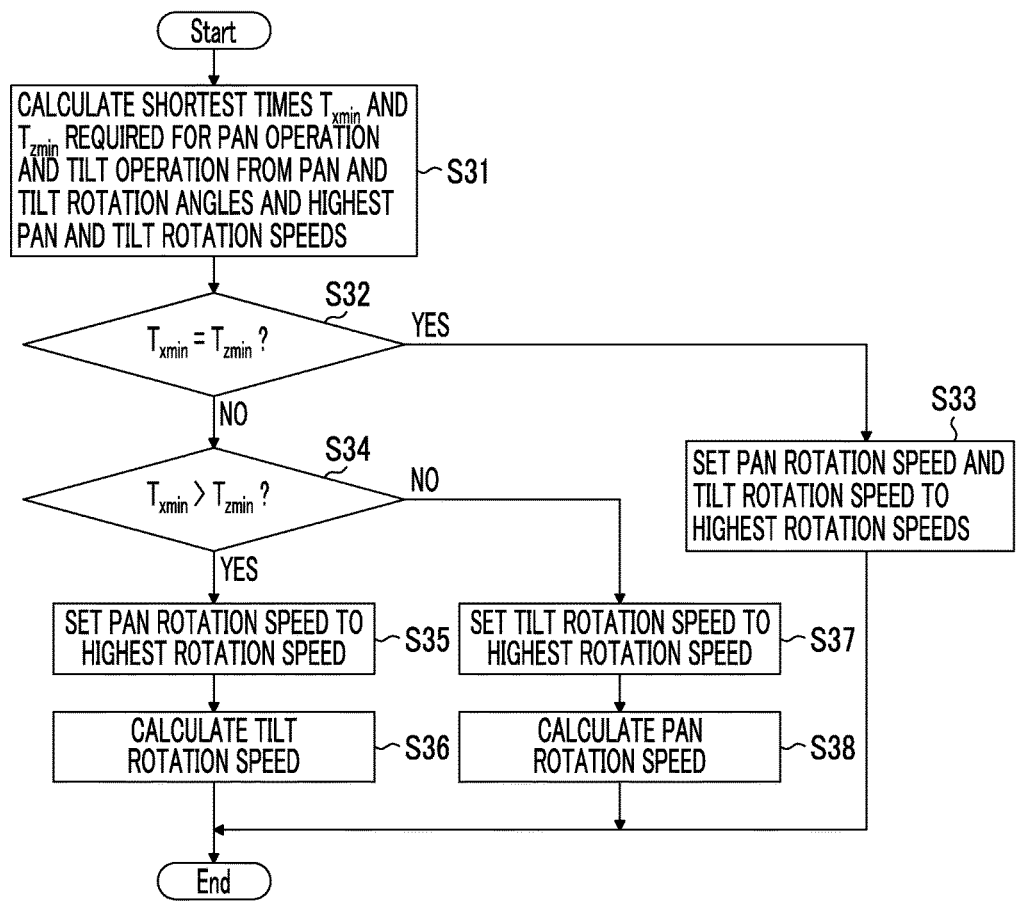
FIG. 12 is a flowchart illustrating a process for calculating the rotation speeds of the pan and tilt operations.

As such, a process for calculating the rotation speeds of the pan and tilt operations for linearly centering the designated object will be described with reference to the flowchart illustrated in FIG. 12.

First, the centering control unit 35 calculates the shortest time required for the pan operation and the tilt operation (Step S31). In a case in which the highest rotation speed of the pan operation of the imaging unit 30 is $\omega_{xmax}$ and the highest rotation speed of the tilt operation is $\omega_{zmax}$, the shortest time $T_{xmin}$ required for the pan operation by the rotation angle $\Delta\varphi_k$ and the shortest time $T_{zmin}$ required for the tilt operation by the rotation angle $\Delta\theta_k$ can be represented by the following expressions:

$$T_{xmin} = \Delta\varphi_k / \omega_{xmax} \quad \text{(Expression 9); and}$$

$$T_{zmin} = \Delta\theta_k / \omega_{zmax} \quad \text{(Expression 10).}$$

Then, the centering control unit 35 compares the shortest time required for the pan operation with the shortest time required for the tilt operation and determines whether $T_{xmin} = T_{zmin}$ is established (Step S32).

In a case in which $T_{xmin} = T_{zmin}$ is established, the centering control unit 35 sets the pan rotation speed $\omega_x$ and the tilt rotation speed $\omega_z$ of the centering operation to $\omega_{xmax}$ and $\omega_{zmax}$ which are the highest rotation speeds (Step S33) and ends the rotation speed calculation process. Since $T_{xmin} = T_{zmin}$ is established, the object at the coordinates $(X_1, Z_1)$ is moved on the straight line A and is centered on the origin $(0, 0)$.

In addition, in a case in which $T_{xmin} = T_{zmin}$ is not established, the centering control unit 35 determines whether $T_{xmin} > T_{zmin}$ is satisfied (Step S34).

In a case in which $T_{xmin} > T_{zmin}$ is satisfied, the centering control unit 35 sets the rotation speed $\omega_x$ of the pan operation to $\omega_{xmax}$ which is the highest rotation speed (Step S35). In addition, the centering control unit 35 calculates the rotation speed $\omega_z$ of the tilt operation as follows in order to synchronize the time required for the tilt operation with the time required for the pan operation (Step S36):

$$\omega_z = \omega_{zmax} \cdot T_{zmin} / T_{xmin} \quad \text{(Expression 11).}$$

Then, the centering control unit 35 ends the rotation speed calculation process. In this way, the time $T_z$ required for the tilt operation is calculated as follows:

$$T_z = \Delta\theta_k / \omega_z = \Delta\varphi_k / \omega_{xmax} = T_{xmin} \quad \text{(Expression 12).}$$

The time required for the pan operation is synchronized with the time required for the tilt operation. Therefore, the object at the coordinates $(X_1, Z_1)$ is moved on the straight line A and is centered on the origin $(0, 0)$.

In contrast, in a case in which $T_{xmin} > T_{zmin}$ is not satisfied, that is, in a case in which $T_{xmin} < T_{zmin}$ is established, the centering control unit 35 sets the rotation speed $\omega_z$ of the tilt operation to $\omega_{zmax}$ which is the highest rotation speed (Step S37). In addition, the rotation speed $\omega_x$ of the pan operation is calculated as follows in order to synchronize the time required for the pan operation with the time required for the tilt operation (Step S38):

$$\omega_x = \omega_{xmax} \cdot T_{xmin} / T_{zmin} \quad \text{(Expression 13).}$$

In this way, the time $T_x$ required for the pan operation is calculated as follows:

$$T_x = \Delta\varphi_k/\omega_x = \Delta\theta_k/\omega_{zmax} = T_{zmin} \quad \text{(Expression 14)}.$$

The time required for the pan operation is synchronized with the time required for the tilt operation. Therefore, the object at the coordinates $(X_1, Z_1)$ is moved on the straight line A and is centered on the origin $(0, 0)$.

As such, the ratio of $\omega_x$ to $\omega_z$ is equal to the ratio of $\Delta\varphi_k$ to $\Delta\theta_k$. In addition, it is possible to center the object at the rotation speed at which the time required is the shortest.

Returning to FIG. 5 again, the centering control unit 35 (an example of pan/tilt control means) controls the imaging direction adjustment unit 32 such that the imaging unit 30 is panned and tilted by the pan-operation rotation angle $\Delta\varphi_k$ and the tilt-operation rotation angle $\Delta\theta_k$ indicating the direction in which the amount of movement is the minimum calculated in Step S9 (Steps S51 to S54 and Steps S61 to 64) at the rotation speed $\omega_x$ of the pan operation and the rotation speed $\omega_z$ of the tilt operation calculated in Step S10 (Steps S31 to S38) (Step S11, an example of a pan/tilt control step). The object displayed at the coordinates $(X_1, Z_1)$ of the touch panel 15 is moved on the straight line A and is then centered on the origin $(0, 0)$ by the above-mentioned imaging direction control process.

Then, the centering control unit 35 calculates the rotation direction and the amount of rotation of the image for aligning the vertical direction after the designated object is centered (an example of "after movement") with the vertical direction before the designated object is centered (an example of "before movement") (Step S12). Here, the rotation direction and the amount of rotation are calculated by template matching using the template image 110 generated in Step S7 as a template.

Figure 13A:
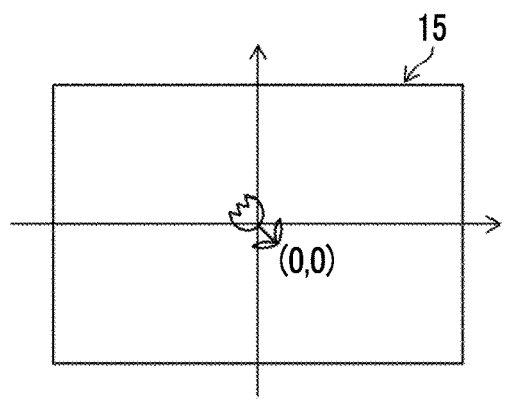
FIGS. 13A to 13D are diagrams illustrating the template matching of an image and the rotation of the image.

FIG. 13(a) is a diagram illustrating an example of the display of the touch panel 15 after centering. As can be seen from the comparison between FIG. 13(a) and FIG. 7(a), in a case in which the object at the coordinates $(X_1, Z_1)$ is moved to the origin $(0, 0)$ of touch panel 15 by the pan and tilt operations, the optical axis L is rotated and the object image (object image data) is rotated on the optical axis L.

Figure 13B:
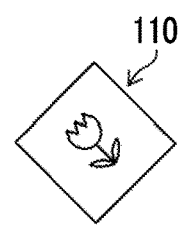

The centering control unit 35 rotates the template image 110 with respect to the image displayed on the touch panel 15 (see FIG. 13(b)) to perform template matching, acquires the rotation direction and the amount of rotation at the time of matching, and uses the acquired rotation direction and the acquired amount of rotation as the rotation direction and the amount of rotation of the image.

Figure 13C:
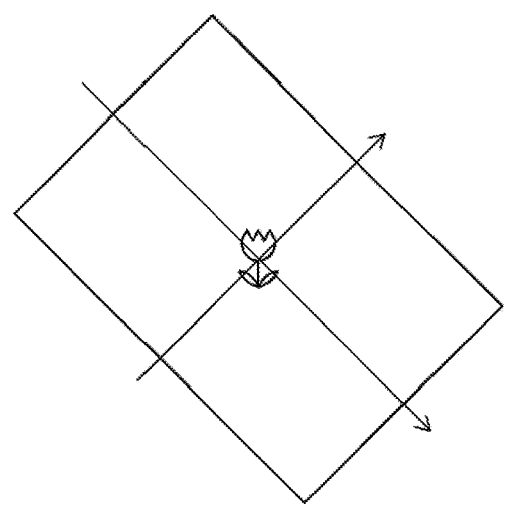
Figure 13D:
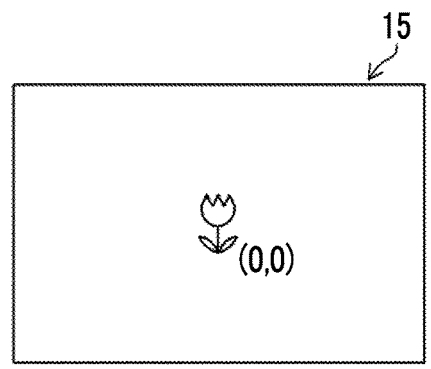

Finally, as illustrated in FIG. 13(c), the centering control unit 35 (an example of image processing means) electronically rotates the image on the origin $(0, 0)$ in the rotation direction and by the amount of rotation calculated in Step S12 (an example of rotation on the optical axis) (Step S13, an example of an image processing step). This image is transmitted to the terminal-side communication unit 44 through the camera-side communication unit 36 by the same communication process as described above and is displayed on the touch panel 15. Then, the process returns to Step S3 and the same process as described above is performed. The following live view image is rotated in the rotation direction and by the amount of rotation and is displayed on the touch panel 15. FIG. 13(d) is a diagram illustrating the display of the touch panel 15 after image rotation.

As such, according to the touch centering function of this embodiment, the object designated by the touch panel 15 is displayed at the center of the display 13. At that time, since the designated object is linearly moved, it is easy for the user to view the designated object. In addition, since the vertical directions of the object before and after centering are aligned with each other, there is no user discomfort when the centered object is viewed.

In this embodiment, the centering control unit 35 is provided in the camera-side controller 34. However, the centering control unit 35 may be provided in the terminal-side controller 40. In this case, for example, necessary signals may be exchanged with the imaging unit 30 or the imaging direction adjustment unit 32 through the terminal-side communication unit 44 and the camera-side communication unit 36.

In addition, in this embodiment, the operation panel 14 of the touch panel 15 is used to designate the object to be centered. However, a cursor displayed on the display 13 may be moved by the operation button 16 to designate the object.

In this embodiment, after the centering of the object ends, the image is rotated to align the vertical direction of the object after the centering with the vertical direction of the object before the centering. However, the image that is being centered may be rotated at any time such that the vertical direction of the object that is being centered is always aligned with the vertical direction of the object before the centering.

[Modification Example of Touch Centering Function]

FIG. 14 is a flowchart illustrating the process of a modification example of the touch centering function. In FIG. 14, the same portions as those illustrated in FIG. 5 are denoted by the same reference numerals and the detailed description thereof will not be repeated.

Figure 5:
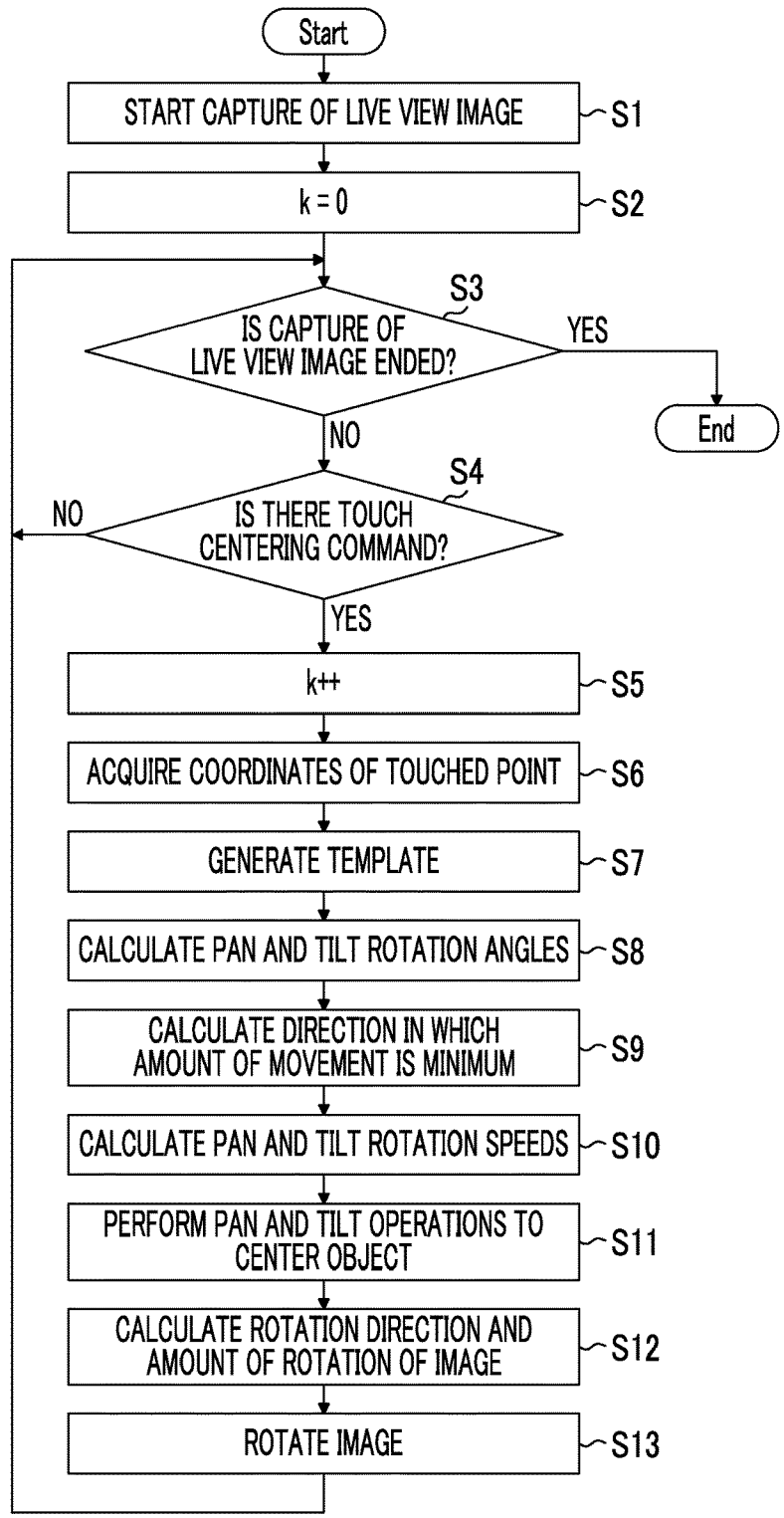
FIG. 5 is a flowchart illustrating the process of the touch centering function.

The start of the capture of a live view image (Step S1), the detection of a touch centering command (Step S4), and the acquisition of the coordinates of the position subjected to a touch centering operation on the touch panel 15 (Step S6) are the same as those in the flowchart illustrated in FIG. 5.

After the coordinates of the position subjected to the touch centering operation are acquired, the centering control unit 35 (an example of face detection means) detects the face of a person from a region (designation point) subjected to the touch centering operation and determines whether the region is a facial region of the person (Step S41). In a case in which the region is not the facial region of the person, the centering control unit 35 proceeds to Step S7. The subsequent processes are the same as those in the flowchart illustrated in FIG. 5.

Figure 15:
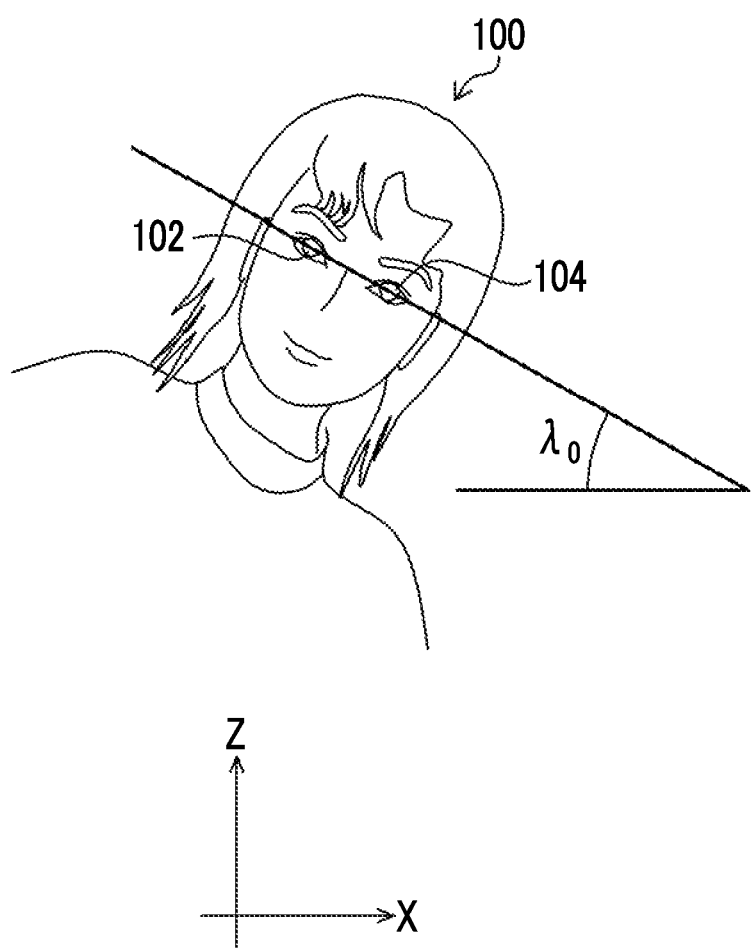
FIG. 15 is a diagram illustrating the inclination of the face of an object which is a person.

In a case in which the region is the facial region of the person, the centering control unit 35 calculates an inclination angle $\lambda_0$ of the face of the person (Step S42). FIG. 15 is a diagram illustrating an example of the inclination angle $\lambda_0$ of the face of the person. In FIG. 15, the angle formed between a straight line connecting a right eye 102 and a left eye 104 of the person that is an object 100 and a horizontal line (X-axis) is $\lambda_0$.

Then, the centering control unit 35 calculates the rotation angles of the pan and tilt operations (Step S43), calculates the direction in which the amount of movement of the pan and tilt operations is the minimum (Step S44), and calculates the rotation speeds of the pan and tilt operations (Step S45). Then, the centering control unit 35 performs the pan and tilt operations at the calculated rotation angles and the calculated rotation speeds to center the designated object on the touch panel 15 (Step S46). These processes are the same as the processes in Steps S8, S9, S10, and S11 in the flowchart illustrated in FIG. 5.

After the centering ends, the centering control unit 35 calculates an inclination angle $\lambda_1$ of the face of the person of which the inclination angle $\lambda_0$ of the face has been calculated in Step S42 (Step S46). The inclination angle of the face may be calculated by the same method as that in Step S42. Here, the angle formed between a straight line connecting the left and right eyes of the person after the centering and the horizontal line is $\lambda_1$.

Finally, the centering control unit 35 calculates a difference $\Delta\lambda$ ($=\lambda_1-\lambda_0$) between the inclination angles of the face before and after the centering, rotates the image on the origin (0, 0) by $\Delta\lambda$, and displays the image on the touch panel 15 (Step S47). The following live view image is rotated by the amount of rotation and is displayed on the touch panel 15.

As such, in a case in which the object designated by the touch centering function is a facial region of the person, the image is rotated such that the inclination of the face of the person is constant before and after centering, which makes it easy for the user to view the object. Here, the case in which the designated object is the facial region of the person has been described. However, in a case in which the designated object is a person, the image may be rotated by the same method as described above such that the inclination of the face of the person is constant before and after centering.

Here, the inclination of the face of the person is constant before and after centering. However, in a case in which the object designated by the touch centering function is a person or the face of a person, the image may be rotated such that the face of the person is upright. For example, centering may be performed such that the vertical direction of the object is aligned with the vertical direction before the centering during the period from the start of the centering to the end of the centering and the image may be rotated such that the face of the person is upright after the centering ends. Alternatively, the image may be rotated such that the face of the person is upright when the object to be centered is designated and the centering may be performed in a state in which the face is upright. As such, in a case in which the face is upright, it is easy for the user to view the object.

The technical scope of the invention is not limited to the scope described in the embodiments. For example, the configurations according to each embodiment can be appropriately combined with each other, without departing from the spirit and scope of the invention.

EXPLANATION OF REFERENCES

10: imaging system
11: terminal device
12: housing
13: display
14: operation panel
15: touch panel
16: operation button
20: camera device
21: imaging optical system
23: base
24: dome cover
25: holding portion
26: gear
30: imaging unit
31: imaging element
31a: imaging surface
32: imaging direction adjustment unit
32P: pan driving unit
32T: tilt driving unit
34: camera-side controller
35: centering control unit
36: camera-side communication unit
40: terminal-side controller
42: user interface
44: terminal-side communication unit
100: object
110: template image
A: straight line
L: optical axis

What is claimed is:

1. An imaging system comprising:
a camera that captures an image of an object to acquire object image data;
pan/tilt driver for rotating the camera in a pan direction and a tilt direction perpendicular to the pan direction;
display for displaying the acquired object image data on a display screen; and
a controller configured to:
receive an input from a user to designate a designation point at an arbitrary position of the display screen;
acquire positional information of the designation point;
linearly move an optical axis of the camera from a current position to a position of a designated object corresponding to the designation point to linearly move the designated object displayed on the display screen from the current position of the display screen to a center of the display screen; and
rotate the object image data displayed on the display screen on the optical axis of the camera and align a vertical direction during and after the movement of the optical axis with a vertical direction before the movement of the optical axis.

2. The imaging system according to claim 1,
wherein the controller calculates a rotation direction and an amount of rotation of the object image data on the basis of template matching using, as a template, a cutout image including the designated object before the movement of the optical axis.

3. The imaging system according to claim 1, wherein the controller is further configured to:
detect a facial region of a person from the acquired object image data,
wherein, in a case in which the designated object is the facial region of the person, the controller sets the face upright.

4. The imaging system according to claim 1,
wherein the controller moves the optical axis of the camera in a rotation direction in which an amount of rotation of the camera in the pan direction and an amount of rotation of the camera in the tilt direction are the minimum.

5. The imaging system according to claim 1, wherein the controller is further configured to:
acquire a first pan-direction rotation angle and a first tilt-direction rotation angle of the camera at a current position with respect to an initial position and calculating a first pan/tilt rotation matrix from an initial-position unit normal vector of an imaging surface at the initial position;
calculate a current-position unit normal vector of the imaging surface in a case in which the initial-position unit normal vector is rotated by the first pan/tilt rotation matrix;
calculate a second pan/tilt rotation matrix from the current-position unit normal vector for the designation point;
calculate a movement destination target vector in a case in which the current-position unit normal vector is rotated by the second pan/tilt rotation matrix;

calculate a second pan-direction rotation angle and a second tilt-direction rotation angle from the initial-position unit normal vector, using the movement destination target vector;

calculate a movement-destination pan-direction rotation angle from a difference between the second pan-direction rotation angle and the first pan-direction rotation angle; and calculate a movement-destination tilt-direction rotation angle from a difference between the second tilt-direction rotation angle and the first tilt-direction rotation angle, wherein the controller controls the pan/tilt driver on the basis of the movement-destination pan-direction rotation angle and the movement-destination tilt-direction rotation angle.

6. The imaging system according to claim 5, wherein the controller makes a ratio of a rotation speed of the camera in the pan direction to a rotation speed of the camera in the tilt direction by the pan/tilt driver equal to a ratio of the movement-destination pan-direction rotation angle to the movement-destination tilt-direction rotation angle.

7. The imaging system according to claim 1, further comprising:
a touch panel that enables the user to designate the designation point with a touch operation.

8. The imaging system according to claim 7, further comprising:
a remote camera; and
a portable terminal,
wherein the display and the touch panel are provided in the portable terminal,
the camera, the pan/tilt driver, and the controller are provided in the remote camera, and
each of the remote camera and the portable terminal comprises communication unit including circuitry for performing communication by at least one of wired or wireless communication.

9. An imaging control method comprising:
rotating a camera that captures an image of an object to acquire object image data in a pan direction and a tilt direction perpendicular to the pan direction;
displaying the acquired object image data on a display screen;
receiving an input from a user to designate a designation point at an arbitrary position of the display screen;
acquiring positional information of the designation point;
linearly moving an optical axis of the camera from a current position to a position of a designated object corresponding to the designation point to linearly move the designated object displayed on the display screen from the current position of the display screen to a center of the display screen; and
rotating the object image data displayed on the display screen on the optical axis of the camera and align a vertical direction during and after the movement of the optical axis with a vertical direction before the movement of the optical axis.

10. The imaging control method according to claim 9, wherein a rotation direction and an amount of rotation of the object image data are calculated on the basis of template matching using, as a template, a cutout image including the designated object before the movement of the optical axis.

11. The imaging control method according to claim 9, further comprising:
detecting a facial region of a person from the acquired object image data,
wherein, in a case in which the designated object is the facial region of the person, the face is set upright.

12. The imaging control method according to claim 9, wherein the optical axis of the camera is moved in a rotation direction in which an amount of rotation of the camera in the pan direction and an amount of rotation of the camera in the tilt direction are the minimum.

13. The method according to claim 9, further comprising:
acquiring a first pan-direction rotation angle and a first tilt-direction rotation angle of the camera at a current position with respect to an initial position and calculating a first pan/tilt rotation matrix from an initial-position unit normal vector of an imaging surface at the initial position;
calculating a current-position unit normal vector of the imaging surface in a case in which the initial-position unit normal vector is rotated by the first pan/tilt rotation matrix;
calculating a second pan/tilt rotation matrix from the current-position unit normal vector for the designation point;
calculating a movement destination target vector in a case in which the current-position unit normal vector is rotated by the second pan/tilt rotation matrix;
calculating a second pan-direction rotation angle and a second tilt-direction rotation angle from the initial-position unit normal vector, using the movement destination target vector;
calculating a movement-destination pan-direction rotation angle from a difference between the second pan-direction rotation angle and the first pan-direction rotation angle; and
calculating a movement-destination tilt-direction rotation angle from a difference between the second tilt-direction rotation angle and the first tilt-direction rotation angle,
wherein the rotation of the camera is performed on the basis of the movement-destination pan-direction rotation angle and the movement-destination tilt-direction rotation angle.

14. The method according to claim 13, wherein a ratio of a rotation speed of the camera in the pan direction to a rotation speed of the camera in the tilt direction is made equal to a ratio of the movement-destination pan-direction rotation angle to the movement-destination tilt-direction rotation angle.

* * * * *